United States Patent [19]

Utsumi et al.

[11] Patent Number: 4,769,190

[45] Date of Patent: Sep. 6, 1988

[54] PROCESS FOR PRODUCING POLYPHENYLENE SULFIDE FILM

[75] Inventors: Shigeo Utsumi, Yokohama; Yujiro Fukuda, Machida; Yoshinori Sato; Narihiro Masuda, both of Yokohama, all of Japan

[73] Assignee: Diafoil Company, Limited, Tokyo, Japan

[21] Appl. No.: 41,424

[22] Filed: Apr. 23, 1987

[30] Foreign Application Priority Data

Apr. 25, 1986 [JP] Japan ................................ 61-96407

[51] Int. Cl.$^4$ ............................................. B29C 41/26
[52] U.S. Cl. ..................................... 264/22; 264/556; 264/213; 264/216; 264/237; 264/235.8; 264/237; 425/174.8 E; 425/224
[58] Field of Search ................... 264/22, 556, 237, 85, 264/216, 213, 212, 24, 235.8; 425/174.8 E, 224, 174

[56] References Cited

U.S. PATENT DOCUMENTS

| | | | |
|---|---|---|---|
| 2,119,702 | 6/1938 | Carroll | 264/213 |
| 2,212,770 | 8/1940 | Foster | 425/224 |
| 3,686,374 | 8/1972 | Hawkins | 264/22 |
| 4,111,625 | 9/1978 | Remmington et al. | 425/174.8 E |
| 4,255,365 | 3/1981 | Heyer | 425/174.8 E |
| 4,309,368 | 1/1982 | Groves | 425/174.8 E |

FOREIGN PATENT DOCUMENTS

| | | | |
|---|---|---|---|
| 37-006142 | 6/1962 | Japan . | |
| 49-99160 | 9/1974 | Japan . | |
| 53-117408 | 2/1978 | Japan . | |
| 53-58780 | 5/1978 | Japan . | |
| 54-12226 | 2/1979 | Japan . | |
| 54-150477 | 11/1979 | Japan | 264/212 |
| 55-44804 | 3/1980 | Japan | 264/556 |
| 55-105533 | 8/1980 | Japan | 264/22 |
| 56-98138 | 8/1981 | Japan | 264/213 |
| 55-00842 | 1/1982 | Japan . | |
| 57-145992 | 8/1982 | Japan . | |
| 58-63415 | 4/1983 | Japan . | |
| 58-70009 | 4/1983 | Japan . | |
| 58-196089 | 4/1983 | Japan . | |
| 59-35921 | 2/1984 | Japan | 264/22 |
| 59-196221 | 11/1984 | Japan | 264/22 |
| 1437045 | 5/1976 | United Kingdom . | |

*Primary Examiner*—Jeffery Thurlow
*Attorney, Agent, or Firm*—Oblon, Fisher, Spivak, McClelland & Maier

[57] ABSTRACT

Disclosed herein is a process for producing a polyphenylene sulfide film, which comprises melt-molding polyphenylene sulfides in a sheet-like form from a die, casting the thus obtained sheet-like form onto a chilled drum on which an adhering liquid has been applied, while closely contacting the sheet-like form with the chilled drum surface by an electrostatic pinning method.

21 Claims, No Drawings

PROCESS FOR PRODUCING POLYPHENYLENE SULFIDE FILM

BACKGROUND OF THE INVENTION

1. Field of the Invention

The present invention relates to a process for producing polyphenylene sulfide films. More particularly, the present invention relates to a process for producing non-oriented polyphenylene sulfide films which have little possibility of suffering from breakage due to so-called edge fracture or other causes when the non-oriented polyphenylene sulfed films are biaxially stretched.

2. Description of the Background

Polyethylene terephthalate films have been widely used as a general-purpose industrial material in recent years. Lately, however, a film having higher heat-resistance than polyethylene terephthalate films is required for meeting increasing demands for saving energy, reduction in size and weight of equipment and enhancement of reliability. Attention has been focused recently on poly-p-phenylene sulfide films as a film that can satisfy these purposes. Poly-p-phenylene sulfide has excellent heat-resistance inherently, but its crystallization rate is faster than that polyethylene terephthalate, so that it is difficult to obtain a film having excellent thermal and mechanical properties, dimensional stability, flatness and uniformity in thickness by merely subjecting a poly-p-phenylene sulfide film made by an ordinary film-forming method to the biaxial stretching and heat-setting treatments. That is, when a non-oriented film is made from poly-p-phenylene sulfide by a method commonly used for forming polyethylene terephthalate films, the produced film is crystallized at the edge because of its high crystallization rate, so that when it is stretched in the machine direction, the edge of the film may not be duly stretched and tends to suffer from edge fracture or other trouble, thereby causing breakage of the film. As a solution to this problem, a method has been proposed in which the crystallized edge alone of the film is cut out with a knife or laser beams. According to this method, however, in the case where the cutout is made with a knife, the knife becomes increasingly blunt with time to make the film liable to be notched, thereby causing frequent break of the films when stretched in the machine direction and finally making it impossible to stretch film. Also, in the case where the cutout is made with laser beams, heat is generated to cause crystallization at the cutting part, and in this case, too, the stretching of the film in the machine direction becomes impossible. Therefore, for producing an oriented polyphenylene sulfide film on an industrial scale, it is essential that the stretching of the film can be accomplished in a stable and steady way, and unless this is made possible, it is difficult to attain a reduction of cost and polyphenylene sulfide film is unsuited for industrial use.

As a result of assiduous studies for solving these problems, it has been found by the present inventors that the problems can be solved by aptly combining the electrostatic adhesion method and the liquid application adhering method, and based on this finding, the present invention has been attained.

SUMMARY OF THE INVENTION

In an aspect of the present invention, there is provided a process for producing a polyphenylene sulfide film, which comprises melt-molding polyphenylene sulfides in a sheet-like form from a die, casting the thus obtained sheet-like form onto a chilled drum on which an adhering liquid has been applied, while closely contacting the sheet-like form with the chilled drum surface by an electrostatic adhesion method.

DETAILED DESCRIPTION OF THE INVENTION

The heart of the present invention lies in a process for producing a non-oriented polyphenylene sulfide film, which comprises melt-molding polyphenylene sulfides in a sheet-like form from a die, immediately casting the thus obtained sheet-like form onto a chilled drum on which an adhering liquid has been applied, while closely contacting the sheet-like form with the chilled drum surface by an electrostatic pinning method.

The polyphenylene sulfide used as starting material in the present invention is a polymer of which the main component of the repeating units is a structure represented by the formula:

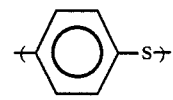

and which has a melt flow index (measured according to ASTM D-1238-70 at 315.6° C. under a load of 5 kg and expressed in unit of g/10 min) in the range of 20 to 90. In the present invention, it is especially preferred to use copolymers having the structural unit of

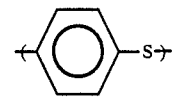

and structural units such as shown below so that the repeating unit of

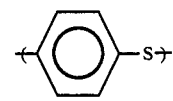

of the main component occupies not less than 50% by mole of the whole structural unit. The copolymerized units are:

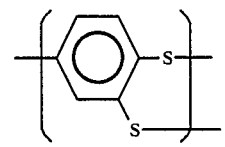

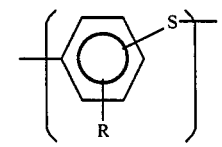

(wherein R represents an alkyl, nitro, phenyl or alkoxyl group)

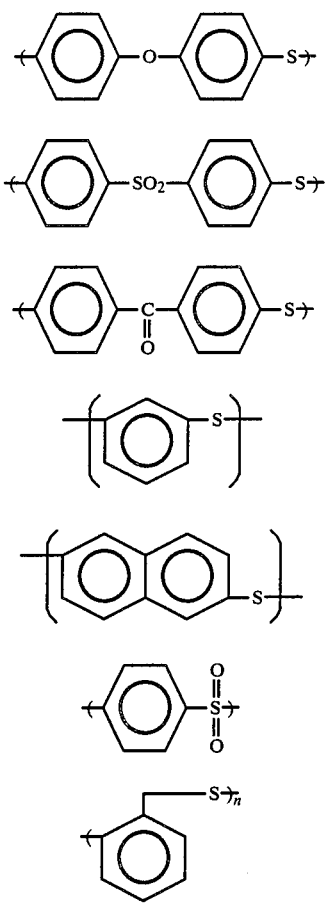

The especially preferred copolymers are those in which the content of p-phenylene sulfide repeating unit in the phenylene sulfide copolymer is not less than 80% by mole but less than 90% by mole. When the content of p-phenylene sulfide repeating unit in the phenylene sulfide copolymer is adjusted to be less than 90% by mole, it is possible to obtain a phenylene sulfide copolymer which is lowered in crystallization rate so that it meets the purpose of the present invention, and such copolymer is more superior to the poly-p-phenylene sulfide. On the other hand, if the copolymerizable component ratio exceeds 20% by mole, the melting point drops excessively and the produced film tends to be reduced in heat resistance.

Polyphenylene sulfide have a high degree of polymerization can be obtained by a conventional method in which an aromatic dihalide is sulfurated or a desalting method using thiophenol salt, but it is preferably produced by reacting an alkali sulfide and a dihalide in a polar solvent at a temperature of 200° to 350° C. It is especially preferred to react p-dihalobenzene and sodium sulfide in amides polar solvent such as N-methylpyrrolidone (see U.S. Pat. No. 3,354,129), and in this case, it is more preferable to add a caustic alkali, carboxylic acid alkali metal salt or the like for adjusting the polymerization degree (see U.S. Pat. No. 3,919,177). As the aromatic halide monomer of the starting material of the phenylene sulfide copolymer, m-dihalobenzenes can used instead of p-dihalsbenzenes as in admixtures with p-dihalobenzene.

The melt flow and the melt viscosity of polyphenylene sulfide can not be unequivocally associated with each other, but the melt flow of 20 to 90 of the polyphenylene sulfide of the present invention approximately corresponds to the melt viscosity of 20,000 to 1,000 poises under a shear rate of 200 sec$^{-1}$ at 300° C. It is not easy to measure the polymerization degree of the polyphenylene sulfide of the present invention since this polyphenylene sulfide is totally insoluble in the ordinary organic solvents at normal temperature. Also, the polymerization degree of this copolymer varies greatly according to the copolymer composition, degree of crosslinking and other factors, so that its correct value is unknown, but the polymerization degree is between about 50 and about 1,000.

The polyphenylene sulfide as the starting material used in the present invention may contain not more than about 5% by weight (based on the weight of the whole composition) of polymer component(s) such as polyallylene sulfide, polyarylate, polyester, polyamide, polyethylene, polystyrene, polycarbonate, polysulfone, polyether sulfone, fluoropolymer, polyimide, etc. and/or not more than about 10% by weight (based on the weight of the whole composition) of organic filler(s) and/or inorganic filler(s) such as glass fiber, carbon fiber, talc, titanium oxide, silicon oxide, carbon black, clay, mica, asbestos, metal powder, etc. Also, additives such as antioxidant, thermal stabilizer, lubricant, nucleating agent, ultraviolet absorber, etc., may be added in an amount ordinarily allowed to be added. If these additional polymers, fillers and additives are contained in excess of the above-defined amounts, the produced film is impaired in its toughness at low temeratures.

As to the method of blending other components in the high polymerization-degree polyphenylene sulfide of the present invention, the particles, powder or pellets of the respective components may be mixed by using a suitable mixing device such as V-type blender, supermixer, etc. and directly supplied to the melt forming process, or they may be mixed and melt extruded and further pelletized by using an extruder, co-kneader, etc., and supplied to the melt forming process.

The thus obtained starting polyphenylene sulfide composition is supplied to a known melt extruder, heated to a temperature above the melting point of the composition, thereby melting the polyphenylene sulfide composition.

The polyphenylene sulfide in the molten state tends to be oxidized and crosslinked on contact with oxygen, and this becomes a cause of gelation of the composition, so that the inside of the hopper of the extruder is preferably replaced with an inert gas such as nitrogen, carbon dioxide, etc.

In the case of conducting melt extrusion by using an extruder, it is more preferable to add 0.01 to 0.5% by weight of a lubricant, for example an organic metal salt, in the starting composition since the addition of lubricant has the effect of reducing heat generation by shear in the solid transfer zone in the extruder barrel, which proves helpful for arresting the gelation peculiar to polyphenylene sulfide.

It is to be also noted that if NaCl produced in the course of preparation of polyphenylene sulfide remains in the composition, it may cause the formation of a granular structure, so that when extruding the composition into a film by an extruder, the content of NaCl in the composition is preferably reduced to not more than 0.5% by weight, more preferably to not more than 0.1% by weight, most preferably to not more than 0.05% by weight.

The melted polyphenylene sulfide composition is continuously extruded from a slit die such as T-die, circular die, etc. and then rapidly cooled on a chilled drum (casting drum) to a temperature below the glass transition temperature of the high polymerization-degree polyphenylene sulfide, the main component of the composition, thereby solidifying the polyphenylene sulfide compositior.

In this process, in order to provide good adhesion between the casting drum and the polyphenylene sulfide film, it is necessary to employ a so-called electrostatic pinning method in which the molten polymer near the contact point between the molten polymer and the drum is electrostatically charged so that the molten polymer is adhered to the drum surface by Coulombic attraction between the static charges and the charges induced on the drum surface, thereby promoting the cooling of the polymer. In this case, to enhance the adhesion by electrostatic charging, it is preferable that the specific resistance ($p_v$) of the polyphenylene sulfide in the molten state at 300° C. is not more than $1\times10^9\Omega\cdot$cm, preferably not more than $1\times10^8\Omega\cdot$cm. In application of the electrostatic pinning method, it is necessary to make the electrode smaller than the film width for preventing discharge through the drum. Generally, in the case of a film such as polyethylene terephthalate film, which is slow to crystallize, if the central part of the film is adhered, both edges thereof can naturally be adhered as well. But in the case of polyphenylene sulfide film both edges of the film where the electrode action in the electrostatic pinning method does not reach are poorly adhered because of high crystallization rate, and in many cases, they may be whitened. The film which has been whitened at both edges becomes incapable of stretching of the film in the stretching step, so that it is impossible to obtain an oriented film.

In the present invention, therefore, when casting the molten polyphenylene sulfide onto the drum, the electrostatic pinning method is used in combination with an liquid application adhering method which comprises applying an adhering liquid on the drum surface to enhance adhesiveness of the film to the drum. The adhering liquid may be applied uniformly over the entire surface of the drum but it may be applied only to a part corresponding to both edges of the film which is outside the coverage of the electrode action in the electrostatic pinning method.

As the adhering liquid applied in this process, there can be used the known liquids that satisfy this purpose, for example, alcohols having a boiling point of 150° to 220° C. and a surface tension not greater than 50 dyn/cm at normal temperature, such as n-hexanol, n-octanol, ethylene glycol, trimethylene glycol, etc., or these alcohols added with a suitable amount, for example, not more than 10% by weight of a nonionic, anionic, cationic or ampholytic surface active agent. Application of oils such as vegetable oils, mineral oils, silicone oils, etc., can also serve for the purpose. Organic liquids other than alcohols having a boiling point of 150° to 220° C. and a surface tension of not greater than 50 dyn/cm at normal temperature, for examples, liquids of aliphatic, aromatic or alicyclic hydrocartons such as nonane, decane, isopropylbenzene, butylbenzene, decalin, tetralin, etc., or their halogen substituted compounds such as m-dichlorobenzene; carboxylic acids such as acetic acid, valeric acid, etc.; carboxylic acid esters such as methyl benzoate, ethyl benzoate, diethyl malonate, etc.; ethers such as acyl ether, anisole, etc.; ketones such as cyclohexanone; nitrile compounds such as capronitrile, benzonitrile, etc.; amines such as aniline, o-toluidine, etc. can be also used. It is also possible to use water singly or a mixture of water and methyl cellosolve, ethyl cellosolve, isopropyl cellosolve, n-propyl cellosolve, isobutyl cellosolve, n-butyl cellosolve, isoamyl cellosolve, diethylene glycol ethyl ether or the like.

Application of the adhering liquid can be accomplished by a conventional method, for example, a method using a spray nozzle.

The preventive effect against crystallization of both film edges becomes even more prominent when the thickness ratio of both edges of the film to its central part at the time of casting is made not more than 2.0. As means for making the thickness ratio of both edges of the film to its central part not more than 2.0, there can be employed the known methods, for example, the lips are arranged to form a barrel-shaped lip clearance, plates for reducing the neckdown are provided at both ends of the die, or the air gap between the die and the casting bar is narrowed as much as possible. These methods may te applied singly or in combination.

Regarding the surface temperature of the casting drum in the polyphenylene sulfide film forming process, a temperature of 30° C. or below was proposed as suited for the purpose (see Japanese Patent Application Laid-Open (Kokai) No. 56-34426 ('81)).

According to the studies by the present inventors, however, it has been found that when the surface temperature of the casting drum is 30° C. or below, no satisfactory electrostatic pinning can be achieved as the film slips on the drum surface, and the cooling effect drops to allow progress of crystallization. Too high a cooling temperature also causes advancement of crystallization and makes it impossible to stretch the film. Therefore, the surface temperature of the cooling drum is preferably between Tg-40° C. and Tg-10° C. (wherein Tg is a glass transition temperature).

The thus obtained non-oriented film is preferably stretched and heat-set, if necessary. In the stretching method, the non-oriented film is stretched 2.0 to 5.0 times the original length in one direction, for example, machine direction, at a temperature in the range of 80° to 120° C., preferably 80° to 110° C., by using a roll or tenter type stretcher. The stretching temperature and-/or stretching ratio are adjusted so that the difference in refractive index between the direction of the orientation (e.g. machine direction) and the direction orthogonal thereto (e.g. transverse direction), that is, birefringence becomes 0.03 to 0.30. The thus obtained uniaxially oriented film may be further stretched 1.5 to 5 times in the direction orthogonal to the direction of the first orientation, for example, in the transverse direction at a temperature in the range of 80° to 150° C., preferably 90 to 140° C., by using a tenter or a roll type stretcher for obtaining a biaxially oriented film. The thus obtained biaxially oriented film may be directly subjected to a heat-setting treatment, but if necessary it may be again stretched in the machine direction and/or the transverse direction.

For increasing the density and for improving the dimensional change properties, heat resistance, mechanical strength, etc., the thus obtained non-oriented film, uniaxially oriented film, biaxially oriented film or re-oriented film is preferably heat-set at a temperature not less than 180° C. and not more than the melting point, preferably not less than 200° C. and not more than the melting point, for 1 to 60 seconds under tension so that the thermal stress won't become zero. If necessary, the heat-set film may be further subjected to a relaxing treatment.

The polyphenylene sulfide film obtained in the manner described above is useful, for example, as electric insulating film under high temperatures, packaging material, cover film for interior trim, base film for magnetic recording media, base film for photographic films, dielectric base film for capacitors, base film for thermal transfer paper, etc.

According to the process of the present invention, it is possible to produce with ease a non-oriented film of polyphenylene sulfide by preventing crystallization at the edges of the film. Thus, the invention has a very high industrial value.

The present invention will be more precisely explained while referring to Examples as follows.

However, the present invention is not restricted to Examples under mentioned. From the foregoing description, one skilled in the art can easily ascertain the essential characteristics of the present invention, and without departing from the spirit and scope thereof, can make various changes and modifications of the invention to adapt it to various usages and conditions.

3.5 times the original length in the machine direction at a film surface temperature of 95° C. by using rolls, then further stretched 3.5 times in the transverse direction at 97° C. by using a tenter, and then heat-set at 260° C. for 95 seconds to obtain a biaxially stretched film. The difference in film-forming properties according to the respective conditions used was shown in Table 1. The film-forming properties were expressed in terms of the number of times of break per day.

The results shown in Table 1 attest to the very excellent film-forming properties of the films which have been produced by using the electrostatic pinning method and the liquid application method in combination, with the thickness ratio of the edges of the film to its central part being made not more than 2.0 and with the chilled drum temperature being set above Tg-40° C. and below Tg-10° C.

EXAMPLES 6-7

Phenylene sulfide copolymers containing 5% by mole, 12% by mole and 25% by mole of m-phenylene sulfide recurring unit were cast and made into films in the same way as Example 1. The results are shown in Table 1.

From the above, it is seen that the phenylene sulfide copolymers having a copolymerizable component of more than 10% in molar ratio have the better film forming properties than the poly-p-phenylene sulfide film.

TABLE 1

| | Casting conditions | | | | |
|---|---|---|---|---|---|
| | Electrostatic adhesion method, used or not | Liquid Application, made or not | Thickness ratio of film edges to central part | Chilled drum temperature | Amount of co-polymerization component (mol %) | Number of times of break per day |
| EXAMPLE 1 | Used | Made (ethylene glycol) | 1.8 | 50° C. | 0 | 10 times/day |
| EXAMPLE 2 | Used | Made (oil) | 1.8 | 50° C. | 0 | 12 times/day |
| EXAMPLE 3 | Used | Made (ethylene glycol) | 1.8 | 10° C. | 0 | 18 times/day |
| EXAMPLE 4 | Used | Made (ethylene glycol) | 2.5 | 50° C. | 0 | 20 times/day |
| EXAMPLE 5 | Used | Made (ethylene glycol) | 1.8 | 75° C. | 0 | 22 times/day |
| EXAMPLE 6 | Used | Made (ethylene glycol) | 1.8 | 50° C. | 5 | 7 times/day |
| EXAMPLE 7 | Used | Made (ethylene glycol) | 1.8 | 50° C. | 12 | 0 times/day |
| COMP. EXAMPLE 1 | Used | Not | 1.8 | 50° C. | 0 | Break occured frequently during stretching in machine direction, and film formation was quite impossible. |

EXAMPLES 1-5 & COMPARATIVE EXAMPLE 1

Used as starting material was a poly-p-phenylene sulfide (PPS) polymer having a non-Newtonian factor of 1.15 and a viscosity of 2,500 poises as determined by measuring at a shear rate of 200 sec$^{-1}$ and 300° C. by using a Kōka type flow tester with a nozzle of 1 mm in diameter and 10 mm in length. This polymer was extruded by a 40 mm-diameter extruder with a nozzle temperature of 300° C. and casted onto a chilled drum under the various conditions shown in Table 1, thereby forming the amorphous films with an average thickness of 200 μm. Electrostatic adhesion method was conducted by applying a voltage of 5 KV by using 0.3 m/m electrodes. Each of the amorphous films was stretched

What is claimed is:

1. A process for producing a polyphenylene sulfide film, comprising:
   melt-molding polyphenylene sulfide in a sheet-like form from a die;
   casting the thus obtained sheet-like form onto a chilled drum onto which an adhering liquid has been applied while closely contacting the sheet-like form with the chilled drum surface using an electrostatic pinning method;
   wherein the thickness ratio of the edges of said sheet-like form to its central part is not less than 2.0 and the surface temperature of said chilled drum is between Tg-40° C. and Tg-10° C.;

and wherein said adhering liquid is at least one member selected from the group consisting of alcohols having a boiling point of between 150° and 220° C. and a surface tension of not more than 50 dyn cm.$^{-1}$ at normal temperatures; further comprising an anionic, a cationic or an ampholytic surface active agent; aliphatic, aromatic and alicyclic hydrocarbons having a boiling point of between 150° and 220° C. and a surface tension of not more than 50 dyn cm$^{-1}$ at normal temperature; halogen substituted derivatives of said aliphatic, aromatic and alicyclic hydrocarbons; carboxylic acid esters; ketones; nitrile compounds; and amines.

2. The process of claim 1, wherein the content of p-phenylene sulfide recurring units in the polyphenylene sulfide is not less than 80% by mole and less than 90% by mole.

3. The process of claim 1, wherein the specific resistance of the polyphenylene sulfide, in the molten state at 300° C., is not more than $1\times10^9 \Omega\cdot cm$.

4. The process of claim 1, wherein said polyphenylene sulfide contains no more than 0.5% by weight of sodium chloride.

5. The process of claim 1, comprising using as a starting material, a polyphenylene sulfide in which the main component are repeating units having a structure represented by the formula

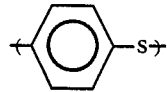

and which has a melt flow index as measured according to ASTM D-1238-70 at a temperature of 315.6° C. under a load of 5 kg and expressed in units of g/10 min, in the range of from 20 to 90.

6. The process of claim 5, wherein said polyphenylene sulfide used as a starting material contains not less than 50% by mole of said repeating units having a structure represented by the formula:

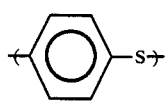

7. The process of claim 5, wherein said polyphenylene sulfide is a copolymer comprising not less than 50% by mole of repeating units of the formula:

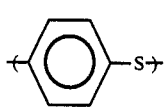

and at least one other repeating unit selected from the group consisting of

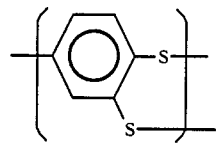

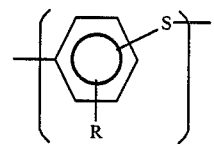

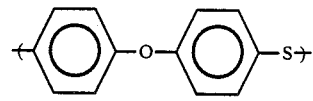

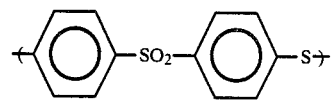

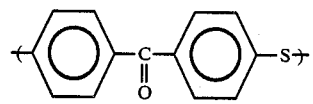

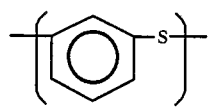

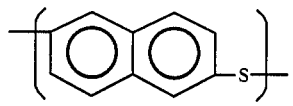

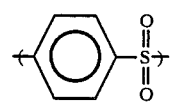

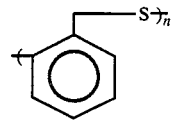

wherein R is an alkyl group, a nitro group, a phenyl group or an alkoxy group.

8. The process of claim 1, wherein said polyphenylene sulfide possess a melt viscosity of 20,000 to 1,000 poises under a shear rate of 200 sec-$^1$ at 300° C.

9. The process of claim 1, wherein said polyphenylene sulfide has a polymerization degree of between about 50 and about 1000.

10. The process of claim 1, comprising using a polyphenylene sulfide starting material containing no more than about 5% by weight, based on the weight of the whole composition, of another polymer component which is at least one member selected from the group consisting of polyallylene sulfides, polyarylates, polyesters, polyamides, polyethylenes, polystyrenes, polycarbonates, polysulfones, polyether sulfones, fluoropolymers and polyimides.

11. The process of claim 1, comprising using a polyphenylene sulfide starting material containing not more than about 10% by weight, based on the weight of the whole composition, of a filler which is at least one member selected from the group consisting of glass fibers, carbon fibers, talcs, titanium oxides, silicon oxides, carbon blacks, clays, micas, asbestos and metal powders.

12. The process of claim 1, comprising using a polyphenylene sulfide containing not more than 0.1% by weight of sodium chloride.

13. The process of claim 1, wherein the specific resistance of the polyphenylene sulfide, in a molten state of 300° C., is not more than $1 \times 10^8 \Omega \cdot cm$.

14. The process of claim 1, comprising applying said adhering liquid either uniformly over the entire surface of the drum or only to a part corresponding to both edges of the film which is outside the coverage of the electrode action in the electrostatic pinning.

15. The process of claim 1, comprising applying said adhering liquid using a spray nozzle.

16. The process of claim 1 comprising stretching and then heat-setting the non-oriented film obtained from said casting step.

17. The process of claim 16, wherein said non-oriented film is stretched 2.0 to 5.0 times the original length in one direction at a temperature in the range of from 80° to 120° C.

18. The process of claim 17, wherein said non-oriented film is stretched at a temperature in the range of from 80° to 110° C., 19. The process of claim 17, comprising using a stretching ratio appropriate to provide a birefringence of from 0.03 to 0.30.

20. The process of claim 17, comprising heat setting at a temperature which is not less than 180° C. and not more than the melting point of the film.

21. The process of claim 20, comprising heat setting the film at a temperature not less than 200° C. and not more than the melting point of the film for 1 to 60 seconds under tension.

* * * * *

UNITED STATES PATENT AND TRADEMARK OFFICE
CERTIFICATE OF CORRECTION

PATENT NO. : 4,769,190

DATED : September 6, 1988

INVENTOR(S) : SHIEGO UTSUMI ET AL.

It is certified that error appears in the above-identified patent and that said Letters Patent is hereby corrected as shown below:

In Claim 1, line 11, delete "not less than 2.0"

and insert --not more than 2.0--.

Signed and Sealed this

Twenty-eighth Day of August, 1990

Attest:

HARRY F. MANBECK, JR.

*Attesting Officer*      *Commissioner of Patents and Trademarks*